United States Patent
Song et al.

(10) Patent No.: US 8,586,660 B2
(45) Date of Patent: Nov. 19, 2013

(54) DIELECTRIC PASTE COMPOSITION, METHOD OF FORMING DIELECTRIC LAYER, DIELECTRIC LAYER, AND DEVICE INCLUDING THE DIELECTRIC LAYER

(75) Inventors: Sun-jin Song, Suwon-si (KR);
Jin-young Kim, Seongnam-si (KR);
Shang-hyeun Park, Yongin-si (KR);
Min-jong Bae, Yongin-si (KR); Tae-won Jeong, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 252 days.

(21) Appl. No.: 13/040,103

(22) Filed: Mar. 3, 2011

(65) Prior Publication Data

US 2011/0251319 A1 Oct. 13, 2011

(30) Foreign Application Priority Data

Apr. 7, 2010 (KR) .................. 10-2010-0031884
Jun. 30, 2010 (KR) .................. 10-2010-0063154

(51) Int. Cl.
*C08K 5/20* (2006.01)

(52) U.S. Cl.
USPC ........... 524/403; 524/233; 524/409; 524/430; 427/372.2

(58) Field of Classification Search
USPC ....................................... 524/403
See application file for complete search history.

(56) References Cited

U.S. PATENT DOCUMENTS

| 2004/0091686 A1* | 5/2004 | Okamoto et al. | 428/209 |
| 2009/0281224 A1* | 11/2009 | Koh et al. | 524/435 |
| 2010/0027192 A1* | 2/2010 | Perry et al. | 361/323 |

FOREIGN PATENT DOCUMENTS

| EP | 1 708 024 A2 | 10/2006 |
| EP | 1 939 894 A1 | 7/2008 |
| JP | 05-025201 A | 2/1993 |
| JP | 2000-501549 A | 2/2000 |
| JP | 2000-294447 A | 10/2000 |
| JP | 2009-081033 A | 4/2009 |
| KR | 1020050049789 A | 5/2005 |
| KR | 1020060002844 A | 1/2006 |
| KR | 1020060077426 A | 7/2006 |
| KR | 1020080041711 A | 5/2008 |
| KR | 1020090002844 A | 1/2009 |
| WO | 97/20324 A1 | 6/1997 |

OTHER PUBLICATIONS

Extended European Search Report dated Sep. 15, 2011.

* cited by examiner

*Primary Examiner* — Doris Lee
(74) *Attorney, Agent, or Firm* — Cantor Colburn LLP

(57) ABSTRACT

A dielectric paste composition including: a plurality of inorganic dielectric particles, a binder, a solvent, and a halogenated hydrocarbon. Also disclosed is a method of forming a dielectric layer, a dielectric layer, and a device including the dielectric layer.

17 Claims, 5 Drawing Sheets

DIELECTRIC PASTE COMPOSITION, METHOD OF FORMING DIELECTRIC LAYER, DIELECTRIC LAYER, AND DEVICE INCLUDING THE DIELECTRIC LAYER

CROSS-REFERENCE TO RELATED APPLICATIONS

This application claims priority to Korean Patent Application No. 10-2010-0031884, filed on Apr. 7, 2010, and Korean Patent Application No. 10-2010-0063154, filed on Jun. 30, 2010, and all the benefits accruing therefrom under 35 U.S.C. §119, the contents of which in their entirety are herein incorporated by reference.

BACKGROUND

1. Field

The present disclosure relates to a dielectric paste composition, method of forming a dielectric layer, a dielectric layer, and a device including the dielectric layer.

2. Description of the Related Art

High-K dielectric layers are widely used as interlayer dielectric layers of film condensers or capacitors. Such devices may be used in electrical devices, including communication devices, power supplies, and inverters, for example. Also, high-K dielectric layers may be used in piezoelectric elements, for pyroelectric elements, and may be used to support a transfer body. For example, a high-K dielectric layer of a powder electroluminescent ("EL") device or a thick dielectric electroluminescent ("TDEL") device may be disposed adjacent to an emission layer in a display device, thereby contributing to an increase in brightness of the emission layer.

A high-K dielectric layer may be formed by melt-kneading or coating, both of which are known to one skilled in the art and can be performed without undue experimentation.

The melt-kneading method includes kneading a polymer and inorganic dielectric particles together at a temperature higher than a melting point of the polymer, and the resulting mixture is formed as a film by melt-extrusion or film blowing (e.g., blown film extrusion). Melt-kneading is disclosed in Japanese Patent Laid-Open Publication Nos. 2000-501549 and 2000-294447, the contents of which in their entirety are herein incorporated by reference. However, it is difficult to form a thin film dielectric layer with a small number of pores using the melt-kneading method.

The coating method includes coating or printing a dielectric paste composition including high-k inorganic dielectric particles, a binder, and a solvent on a substrate to form a dielectric layer. When a dielectric layer is prepared by the coating method, a dielectric constant of the dielectric layer may be increased by increasing a content of the inorganic dielectric particle in the dielectric paste composition. However, when a concentration of the inorganic dielectric particles in the dielectric paste composition is excessively high, the viscosity of the dielectric paste composition is increased, and thus it is difficult to suitably apply the composition using a printing or coating process. Also, a dielectric layer formed using a dielectric paste composition having a high concentration of inorganic dielectric particles is undesirably thick. To address these and other problems, use of at least two kinds of inorganic dielectric particles having different sizes to increase a dielectric constant by increasing a packing factor, or use of a solvent having a boiling point of 160° C. or higher to prevent loss of a dielectric constant by preventing pore formation, have been proposed. See, for example, Korean Patent Publication No. 2006-0002844, the content of which in its entirety is herein incorporated by reference. In addition, to improve the dispersion and coating properties of the inorganic dielectric particle in a dielectric paste composition, an additive, such as a dispersant, an antifoaming agent, a leveling agent, and/or an antioxidant are used. See, for example, Korean Patent Publication No. 2005-0049789, the content of which in its entirety is herein incorporated by reference. Moreover, to form a dielectric layer with excellent surface properties, a leveling agent, a plasticizer, and/or an adhesive is used. See, for example, Korean Patent No. 0718923, the content of which in its entirety is herein incorporated by reference. Also, the inorganic dielectric particle may be surface-treated, or a dispersant, a surfactant, and/or a coupling agent may be added. See, for example, Korean Patent Publication No. 2008-0041711, the content of which in its entirety is herein incorporated by reference. However, when a dielectric layer is formed using a commercially available coating method such as the foregoing, the dielectric constant of the dielectric layer is indirectly increased by using additives, which provide an improvement in dispersibility, coating properties, and surface smoothness of the dielectric paste composition to indirectly improve the dielectric constant of the dielectric layer formed using the dielectric paste composition, and thus there is a limit to the extent to which the dielectric constant may be improved using such methods. Thus there remains a need for an improved composition for forming a dielectric layer.

SUMMARY

Provided is a dielectric paste composition including a halogenated hydrocarbon.

Provided is a method of forming a dielectric layer by using the dielectric paste composition.

Provided is a dielectric layer prepared using the dielectric paste composition.

Provided is a device including the dielectric layer.

Additional aspects, features, and advantages are set forth in part in the description which follows and, in part, will be apparent from the description.

According to an aspect, a dielectric paste composition includes: inorganic dielectric particles, a binder, a solvent, and a halogenated hydrocarbon.

The halogenated hydrocarbon may include at least one compound selected from the group consisting of chloroform, dichloromethane, dichloroethane, dichloroethylene, trichloroethylene, tetrachloromethane, chlorobenzene, dichlorobenzene, trichlorobenzene, trichlorofluoromethane, trichlorotrifluoroethane, dibromomethane, bromoform, bromochloromethane, methyliodide, polyvinylchloride, poly(4-chlorostyrene), poly(4-bromostyrene), polychlorotrifluoroethylene, polytetrafluoroethylenepropylene, polytetrafluoroethylene, a perfluoroalkoxy compound, and poly(2-chloro-1,3-butadiene).

The amount of the halogenated hydrocarbon may be about 0.1 to about 40 parts by weight, based on 100 parts by weight of the dielectric paste composition.

According to another aspect, a method of preparing a dielectric layer includes: disposing a dielectric paste composition including: inorganic dielectric particles, a binder, a solvent, and a halogenated hydrocarbon on a substrate; and drying the disposed dielectric paste composition to prepare the dielectric layer.

The drying may be performed at a temperature of about 60 to about 200° C.

The disposing the dielectric paste composition may include printing or coating the dielectric paste composition, and the printed or coated dielectric paste composition may not be subjected to a sintering process.

According to another aspect, a dielectric layer includes: inorganic dielectric particles, a binder, and a halogenated hydrocarbon.

The dielectric layer may be flexible.

According to another aspect, a device includes the dielectric layer described above.

The device may be an inorganic electroluminescent device, a film condenser, a capacitor, a piezoelectric element, a pyroelectric element, or a flexible display.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
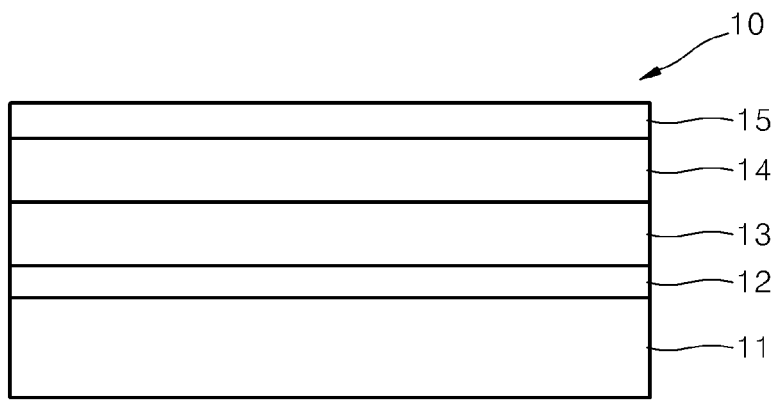
FIG. 1 is a cross-sectional view of an embodiment of an inorganic electroluminescent device comprising a dielectric layer prepared using an embodiment of a dielectric paste composition.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"Hydrocarbon" means an organic compound having at least one carbon atom and at least one hydrogen atom, wherein one or more of the hydrogen atoms can optionally be substituted by a halogen atom (e.g., $CH_3F$, $CHF_3$ and $CF_4$ are each a halogenated hydrocarbon as used herein).

"Alkane" means a straight or branched chain saturated hydrocarbon.

"Alkyl" means a straight or branched chain, saturated, monovalent hydrocarbon group (e.g., methyl or hexyl).

"Cycloalkane" means a compound having one or more saturated rings in which all ring members are carbon (e.g., cycopentane and cyclohexane).

"Cycloalkyl" means a monovalent group having one or more saturated rings in which all ring members are carbon (e.g., cycopentyl and cyclohexyl).

"Alkylene" means a straight or branched chain, saturated, divalent aliphatic hydrocarbon group, (e.g., methylene ($-CH_2-$) or, propylene ($-(CH_2)_3-$)).

"Alkene" means a straight or branched chain hydrocarbon having at least one carbon-carbon double bond.

"Alkenyl" means a straight or branched chain, monovalent hydrocarbon group having at least one carbon-carbon double bond (e.g., ethenyl ($-HC=CH_2$)).

"Alkenylene" means a straight or branched chain, divalent hydrocarbon group having at least one carbon-carbon double bond (e.g., ethenylene ($-HC=CH-$)).

"Cycloalkene" means a compound having one or more rings and one or more carbon-carbon double bond in the ring, wherein all ring members are carbon (e.g., cycopentane and cyclohexane).

"Cycloalkenyl" means a monovalent group having one or more rings and one or more carbon-carbon double bond in the ring, wherein all ring members are carbon (e.g., cycopentyl and cyclohexyl).

"Alkyne" means a straight or branched chain hydrocarbon having at least one carbon-carbon triple bond.

"Alkynyl" means a straight or branched chain, monovalent hydrocarbon group having at least one carbon-carbon triple bond (e.g., ethynyl).

"Alkynylene" means a straight or branched chain, divalent hydrocarbon group having at least one carbon-carbon double bond (e.g., ethynylene).

"Arene" means a hydrocarbon having an aromatic ring, and includes monocyclic and polycyclic hydrocarbons wherein the additional ring(s) of the polycyclic hydrocarbon may be aromatic or nonaromatic. Specific arenes include benzene, naphthalene, toluene, and xylene.

"Aryl" means a monovalent group formed by the removal of one hydrogen atom from one or more rings of an arene (e.g., phenyl or napthyl).

"Arylene" means a divalent group formed by the removal of two hydrogen atoms from one or more rings of an arene, wherein the hydrogen atoms may be removed from the same or different rings (e.g., phenylene or napthylene).

"Alkoxy" means an alkyl group that is linked via an oxygen (i.e., alkyl-O—), for example methoxy, ethoxy, and sec-butyloxy groups.

The prefix "halo" means a group or compound including one more of a fluoro, chloro, bromo, iodo, and astatino substituent. A combination of different halo groups (e.g., bromo and fluoro) can be present.

The prefix "hetero" means that the compound or group includes at least one ring that is a heteroatom (e.g., 1, 2, or 3 heteroatom(s)), wherein the heteroatom(s) is each independently N, O, S, Si, or P.

"Substituted" means that the compound or group is substituted with at least one (e.g., 1, 2, 3, or 4) substituent independently selected from a hydroxyl (—OH), a C1-9 alkoxy, a C1-9 haloalkoxy, an oxo (=O)), a nitro ($-NO_2$), a cyano (—CN), an amino ($-NH_2$), an azido ($-N_3$), an amidino ($-C(=NH)NH_2$), a hydrazino ($-NHNH_2$), a hydrazono ($-C(=NNH_2)-$), a carbonyl ($-C(=O)-$), a sulfonyl ($-S(=O)_2-$) a thiol (—SH), a thiocyano (—S—CN), a tosyl ($CH_3C_6H_4SO_2-$), a carboxylic acid (—C(=O)OH), a carboxylic C1 to C6 alkyl ester (—C(=O)OR wherein R is a C1 to C6 alkyl group), a carboxylic acid salt (—C(=O)OM wherein M is an organic or inorganic anion), a sulfonic acid ($-SO_3H_2$), a sulfonic mono- or dibasic salt ($-SO_3MH$ or $SO_3M_2$ wherein M is an organic or inorganic anion), a phosphoric acid ($-PO_3H_2$), a phosphoric acid mono- or dibasic salt ($-PO_3MH$ or $PO_3M_2$ wherein M is an organic or inorganic anion), a C1 to C12 alkyl, a C3 to C12 cycloalkyl, a C2 to C12 alkenyl, a C5 to C12 cycloalkenyl, a C2 to C12 alkynyl, a C6 to C12 aryl, a C7 to C13 arylalkylene, a C4 to C12 heterocycloalkyl, and a C3 to C12 heteroaryl instead of hydrogen, provided that the substituted atom's normal valence is not exceeded.

A dielectric paste composition will now be disclosed in further detail. A dielectric paste composition comprises inorganic dielectric particles, a binder, a solvent, and a halogenated hydrocarbon.

The inorganic dielectric particles are used to provide a high dielectric constant to the dielectric paste composition. Although the dielectric paste composition comprises the inorganic dielectric particles having a high dielectric constant, the intrinsic (e.g., natural) dielectric constant of the inorganic dielectric particles is not sufficiently exhibited when the amount of the inorganic dielectric particles is not large enough or a degree of dispersion of the inorganic dielectric particles in the binder is insufficient. Thus the observed dielectric constant of a dielectric paste composition may be lower than would be expected based on the inorganic particle content of the dielectric paste composition. To address these and other problems, a halogenated hydrocarbon, which will be disclosed below in further detail, is included in the dielectric paste composition.

The inorganic dielectric particle comprises, consists essentially of, or consists of a metal oxide according to Formula 1:

$$A_w M_x^1 M_y^2 O_z \qquad (1)$$

wherein A is a Group 2 element, $M^1$ is a Groups 4, 12, 14, or 15 element, $M^2$ is a Groups 3 to 5 element, w and y are each independently greater than or equal to 0, and x and z are each independently greater than 0.

In an embodiment, $M^1$ is a Groups 12, 14, or 15 element, and $M^2$ is a rare earth or a Group 4 element. In an embodiment, A is Ba or Mg. In an embodiment, the Group 4 element is Ti and $M^1$ is Zn, Bi, Pb, or Sb.

The inorganic dielectric particles may comprise, consist essentially of, or consist of a material having a dielectric constant of 100 or greater. The inorganic dielectric particles may comprise, for example, at least one of a metal oxide, a complex metal oxide, or a solid solution comprising a metal oxide. A combination of metal oxides is specifically mentioned. The dielectric constant of the inorganic dielectric particle may be about 10 to about $10^8$, specifically about 10 to about $10^7$, more specifically about $10^3$ to about $10^6$. For example, the inorganic dielectric particles may include at least one of a titanium oxide, such as barium titanate, barium zirconium titanate, zinc titanate, strontium titanate, calcium titanate, bismuth titanate, barium neodymium titanate, lead titanate, and magnesium titanate; an antimony oxide, such as barium antimonate, strontium antimonate, calcium antimonate, lead antimonate, and magnesium antimonate; and a tin oxide, such as barium stannate and strontium stannate.

The inorganic dielectric particles may have an average diameter (e.g., number average largest diameter) of about 1 micrometer (μm) or less, specifically about 1 nanometer (nm) to about 1 μm, more specifically about 10 nm to about 100 nm. When the average diameter of the inorganic dielectric particles is within this range, a thin film dielectric layer having excellent surface smoothness may be obtained using the dielectric paste composition.

The amount of the inorganic dielectric particles may be in the range of about 10 to about 70 parts by weight, specifically about 15 to about 65 parts by weight, more specifically about 20 to about 60 parts by weight, based on 100 parts by weight of the dielectric paste composition. When the amount of the inorganic dielectric particles is within this range, loss or reduction of the dielectric constant of the dielectric paste composition when subjected to a drying process may be reduced, and the dielectric paste composition has an appropriate viscosity, thereby providing improved processability, and thus a uniform, thin film may be easily formed. Accordingly, a highly transmissible, transparent dielectric layer may be formed with the dielectric paste composition.

The binder may bind and/or disperse components of the dielectric paste composition, for example, the inorganic dielectric particles and the halogenated hydrocarbon.

The binder may include at least one polymer. The binder may comprise at least one of a thermoplastic resin, and a thermosetting resin. The thermoplastic resin may include at least one of cyanoethyl pullulan, a copolymer of cyanoethyl pullulan and cyanoethyl polyvinyl alcohol, a polycarbonate, a polysaccharide including cellulose, polycycloolefin, polyphenylene oxide, polysulfone, polyvinyl chloride, polymethylmethacrylate, polyphenylene ether, polyphenylene sulfide, polyethersulfone, polyetherimide, a liquid crystal polymer, polystyrene, polyethylene, polyurethane, polyimide and polyvinylidene fluoride. The thermosetting resin may include at least one of an epoxy resin, phenolic resin, polysiloxane, poly(C1 to C6)alkyl acrylate, a cyanate resin, and a benzocyclobutene resin.

The binder polymer may have a weight average molecular weight ("Mw") in the range of about 10,000 to about 10,000,000 Daltons, specifically about 100,000 to about 1,000,000 Daltons, more specifically about 200,000 to about 900,000 Daltons.

The amount of the binder may be in the range of about 1 to about 30 parts by weight, specifically about 2 to about 25 parts by weight, more specifically about 4 to about 20 parts by weight, based on 100 parts by weight of the dielectric paste composition. When the amount of the binder is within this range, the dispersibility of the inorganic dielectric particles in the dielectric paste composition, and the dielectric constant of a dielectric layer formed using the dielectric paste composition, may be maintained at a suitably high level.

The solvent may substantially or entirely dissolve the binder, and the binder and the inorganic dielectric particles are contacted (e.g., mixed together) and dispersed in the solvent. The solvent may have a high boiling point, for example, in the range of about 50 to about 500° C., specifically about 100 to about 200° C., more specifically about 120 to about 180° C. The boiling point of the solvent may be selected such that the solvent does not evaporate too fast when coating and drying the dielectric paste composition.

The solvent may comprise at least one of an aromatic hydrocarbon, a ketone, a sulfoxide, a lactone, a formamide, an acetamide, a pyrrolidone, a lactam, an acetate, an ester, a carbonate, an alcohol, or an ether. The solvent is not halogenated.

The solvent may include at least one of mesitylene, acetenyl acetone, methylcyclohexanone, diisobutylketone, methylphenylketone, dimethyl sulfoxide, γ-butyrolactone, isophorone, diethylformamide, dimethylformamide, dimethylacetamide, N-methylpyrrolidone, γ-butyrolactam, ethyleneglycol acetate, 3-methoxy-3-methylbutanol and an acetate thereof, 3-methoxybutyl acetate, 2-ethylhexyl acetate, oxalic acid ester, diethyl malonate, maleic acid ester, propylene carbonate, butyl cellosolve, and ethyl carbitol.

In an embodiment, the solvent may comprise at least one of toluene, xylene, dibutyl ether, and diphenyl ether.

When the amount of the solvent is sufficient, the viscosity of the dielectric paste composition including the solvent is suitable for deposition, and thus it is easy to form a thin film dielectric layer. However, when the amount of the solvent is excessive, it is difficult to form a dielectric layer and a dielectric withstanding voltage ("DWV") decreases.

A wide variety of halogenated hydrocarbons can be used, based on factors such as the type and amount of dielectric particles, the type and amount of binder, the type and amount of solvent, processing conditions, and the desired characteristics of the dielectric layer formed from the dielectric paste. The halogenated hydrocarbon may include a low molecular weight compound, for example, a compound having a molecular weight in the range of 34 to about 250 Daltons, or a higher molecular weight compound (which as used herein includes oligomers), for example a compound having a molecular weight in the range of greater than about 250 to about 600 Daltons. A polymer having two or more repeat units can also be used, or a combination comprising one or more compounds, one or more polymers, or a combination of at least one compound and at least one polymer. The halogenated hydrocarbon, each includes one or more halogens, such as fluorine, chlorine, bromine, iodine, or astatine. More than one halogen atom can be present, each being the same or different type of halogen, e.g., a fluorine and a chlorine can be present in combination.

In a specific embodiment the halogenated hydrocarbon may include a compound that is liquid at room temperature (e.g., 21° C.), for example a low molecular weight compound that is liquid at room temperature. Use of a liquid compound allows the halogenated hydrocarbon to be sufficiently combined with the other components of the dielectric paste composition, and sufficiently dispersed in the dielectric paste composition.

In another specific embodiment, the halogenated hydrocarbon may include a polymer that is a solid at room temperature, and is used in a powder form. Use of the polymer in powder form may increase the stability of the dielectric paste composition after the drying process. The particle size of the polymer can vary widely depending on the particular polymer, dielectric particles, binder, solvent, and desired properties of the dielectric layer, and can be determined by one of skill in the art without undue experimentation. The particle size distribution can be monomodal, bimodal, trimodal, or higher. In an embodiment, the halogenated hydrocarbon polymer powder can have an average particle size in the range of 0.001 to 1,000 micrometers, specifically 0.01 to 100 micrometers, more specifically 0.1 to 10 micrometers.

In addition, the halogenated hydrocarbon may be partially or entirely dissolved in the solvent.

The halogenated hydrocarbon may be physically or chemically bonded to the inorganic dielectric particle or a binder. Bonding of the halogenated hydrocarbon may be confirmed by determining if the halogenated hydrocarbon (for example, chloroform) is present in a dielectric layer prepared by coating the dielectric paste composition on a substrate and drying the resulting coating (see, for example, Analysis Example 1 and FIG. 6). The chemical bond may be an ionic bond between a halogen of the halogenated hydrocarbon and a metal ion of the inorganic dielectric particles.

The halogenated hydrocarbon compound may include at least one of a substituted or unsubstituted C1 to C18 haloalkane, a substituted or unsubstituted C5 to C18 halocycloalkane, a substituted or unsubstituted C4 to C17 haloheterocyclalkane, a substituted or unsubstituted C2 to C18 haloalkene, in particular a further substituted or unsubstituted C6 to C18 haloarylalkene, a substituted or unsubstituted C5 to C18 halocycloalkene, a substituted or unsubstituted C4 to C17 haloheterocycloalkene, a substituted or unsubstituted C2 to C18 haloalkyne, a substituted or unsubstituted C6 to C18 haloarene, or a substituted or unsubstituted C4 to C17 haloheteroarene.

More specifically, the halogenated hydrocarbon compound may include at least one of a substituted or unsubstituted C1 to C12 haloalkane, a substituted or unsubstituted C5 to C12 halocycloalkane, a substituted or unsubstituted C4 to C12 haloheterocycloalkane, a substituted or unsubstituted C2 to C12 haloalkene, in particular a further substituted or unsubstituted C6 to C12 haloarylalkene, a substituted or unsubstituted C5 to C12 halocycloalkene, a substituted or unsubstituted C4 to C11 haloheterocycloalkene, a substituted or unsubstituted C2 to C12 haloalkyne, a substituted or unsubstituted C6 to C12 haloarene, and a substituted or unsubstituted C4 to C11 haloheteroarene. In the foregoing embodiments, more than one, and in particular 2, 3, or 4 halogen atoms can be present, wherein each halogen atom is the same or different. It is also possible for each compound to be perhalogenated, for example perfluorinated. Further in the foregoing embodiments, the substituent may be at least one of an amino, a C1 to C6 alkoxy, a carbonyl, a carboxylic acid, a carboxylic C1 to C6 alkyl ester, a cyano, a hydroxyl, a nitro, an oxo, a sulfonyl, a C1 to C16 alkyl, a C5 to C16 cycloalkyl, a C2 to C6 alkenyl, a C2 to C6 alkynyl, a C6 to C12 aryl, and a C7 to C13 arylalkylene.

Still more specifically, the halogenated hydrocarbon compound may include at least one of a low molecular weight compound that is liquid at room temperature, which may be a substituted or unsubstituted C1 to C6 haloalkane, a substituted or unsubstituted C8 to C12 haloarylalkene, and a substituted or unsubstituted C6 to C12 haloarene. In the foregoing embodiments, more than one, and in particular 1, 2, 3, or 4 halogen atoms can be present, wherein each halogen atom is the same or different. It is also possible for each compound to be perhalogenated, for example perfluorinated. Further in the foregoing embodiments, the substituent may be at least one of a C1 to C4 alkoxy, a cyano, a C1 to C4 alkyl, a C6 aryl, and a C7 to C9 arylalkylene.

Specific examples of the halogenated hydrocarbon may include at least one low molecular weight compound such as chloroform, dichloromethane, dichloroethane, dichloroethylene (including 1,2- or 1,1-dichlorethene), trichloroethylene (including 1,1,1- 1,1,2-, or 1,2,2-trichloroethene), tetrachloromethane, chlorobenzene, dichlorobenzene (including 1,2-, 1,3-, and 1,4-dichlorobenzene), trichlorobenzene (including 1,2,3- and 1,2,4-trichlorobenzene), trichlorofluoromethane, trichlorotrifluoroethane (including 1,1,1-trichloro- and 2,2,2-trifluoroethane) dibromomethane, bromoform (tribromomethane), bromochloromethane, and methyliodide. A combination comprising at least one of the foregoing compounds can be used.

The halogenated hydrocarbon polymer may include at least one of a polymer of a substituted or unsubstituted C2 to C18 haloalkene, a polymer of a substituted or unsubstituted C5 to C18 halocycloalkene, a polymer of a substituted or unsubstituted C8 to C18 haloarylalkene, a polymer of a substituted or unsubstituted C6 to C18 haloarene, or a polymer of a halo(C1 to C12)alkyl(meth)acrylate. In the foregoing embodiments, more than one, and in particular 2, 3, or 4 halogen atoms can be present in each polymer unit, wherein each halogen atom is the same or different. It is also possible for each polymer unit to be perhalogenated, for example perfluorinated. It is to be understood that the foregoing polymers are inclusive of copolymers, wherein the copolymer units may be halogenated units as described above, or non-halogenated, for example units derived from a substituted or unsubstituted C2 to C18 alkene, a substituted or unsubstituted C5 to C18 cycloalkene, and a substituted or unsubstituted C8 to C18 arylalkene. Where the additional units are nonhalogenated, they will be present in a small amount, for example 0.1 to 25 mole %, based on the total moles of the polymer units. In the foregoing embodiments, the substituent may be at least one of an a C1 to C6 alkoxy, a C1- to C6 halogenated alkoxy, a C1-C6 perfluorinated alkoxy, a carboxylic C1 to C6 alkyl ester, a cyano, a C1 to C6 alkyl, a C5 to C6 cycloalkyl, a C2 to C6 alkenyl, a C2 to C6 alkynyl, a C6 to C12 aryl, and a C7 to C13 arylalkylene.

More specifically, the halogenated hydrocarbon polymer may include a polymer of a substituted or unsubstituted C2 to C8 haloalkene, a polymer of a substituted or unsubstituted C4 to C24 haloarylalkene, or a polymer of a halo(C1 to C18)alkyl (meth)acrylate. In the foregoing embodiments, more than one, and in particular 2, 3, or 4 halogen atoms can be present in each polymer unit, wherein each halogen atom is the same or different. It is also possible for each polymer unit to be perhalogenated, for example perfluorinated. The foregoing polymers are inclusive of copolymers, wherein the copolymer units may be the halogenated units as described above, or non-halogenated, for example units derived from a substituted or unsubstituted C2 to C8 alkene, and a substituted or unsubstituted C8 to C12 arylalkene. Where the additional units are nonhalogenated, they will be present in a small amount, for example 0.1 to 10 mole %, based on the total moles of the polymer units. Further in the foregoing embodiments, the substituent may be at least one of a C1 to C3 alkoxy, a C1 to C3 halogenated alkoxy, a C1-C3 perfluorinated alkoxy, a cyano, and a C1 to C3 alkyl.

Specific examples of the halogenated hydrocarbon polymer include poly(vinyl chloride) ("PVC"), poly(vinyl fluoride) ("PVF"), poly(vinylidene fluoride) (PVDF"), poly(4-chlorostyrene), poly(4-bromostyrene), poly(chlorotrifluoroethylene), poly(tetrafluoroethylene-propylene), poly(tetrafluoroethylene) (PTFE"), poly (hexafluoropropylene) ("HFP"), poly(3-chloropentafluoropropene), poly(vinylidene fluoride-hexafluoropropylene) (VDF-HFP), poly (tetrafluoroethylene-hexafluoropropylene-ethylene) ("THE"), poly(vinylidene fluoride-hexafluoropropylene-tetrafluoroethylene) ("VDF-HFP-TFE"), poly(tetrafluoroethylene-hexafluoropropylene-vinylidene fluoride) ("THV"), poly(perfluoro(C1 to C8)alkyl(meth)acrylate), perfluoroalkoxy (also known as a poly(perfluoroalkyl vinyl ether), including poly(tetrafluoroethylene-perfluoroalkoxy) ("PFA")), and poly(2-chloro-1,3-butadiene), but is not limited thereto. Polyvinyl chloride is specifically mentioned.

The molecular weight of the halogenated hydrocarbon polymer can vary depending on the desired properties of the dielectric layer. The halogenated hydrocarbon polymer may have, for example, a number average molecular weight of about 250 to about 1,000,000 Daltons, specifically about 500 to about 500,000 Daltons, more specifically about 1,000 to about 100,000 Daltons.

The amount of the halogenated hydrocarbon in the dielectric paste composition may be in the range of about 0.1 to about 40 parts by weight, specifically about 0.2 to about 30 parts by weight, more specifically about 1 to about 20 parts by weight, based on 100 parts by weight of the dielectric paste composition. For example, when the halogenated hydrocarbon includes a polymer, for example a polymer powder, the amount of the polymer may be in the range of about 0.1 to about 5 parts by weight, specifically about 0.2 to about 4 parts by weight, more specifically about 0.4 to about 3 parts by weight, based on 100 parts by weight of the dielectric paste composition, and when the halogenated hydrocarbon includes a low molecular weight compound that is in the form of a liquid at room temperature, the amount of the low molecular weight compound may be in the range of about 1 to about 40 parts by weight, specifically about 2 to about 30 parts by weight, more specifically about 4 to about 20 parts by weight, based on 100 parts by weight of the dielectric paste composition. When the amount of the halogenated hydrocarbon is within these ranges, a significant increase in the dielectric constant may be obtained, and the miscibility of the halogenated hydrocarbon in the dielectric paste composition may be suitably high, and thus a uniform dielectric layer may be formed.

Hereinafter, a method of preparing a dielectric layer using the dielectric paste composition will be disclosed in further detail.

According to an embodiment, there is provided a method of preparing a dielectric layer, the method including disposing (e.g., printing or coating) the dielectric paste composition on a substrate, and drying the dielectric paste composition which is disposed (e.g., printed or coated) on the substrate.

The coating process may be performed by spin coating, roll coating, or spray coating, for example.

The substrate may be appropriately selected according to the use of a dielectric layer to be prepared. For example, the substrate may be a glass substrate, or a glass substrate printed or coated with an electrode material.

The drying process may be performed at a temperature in the range of about 60 to about 200° C., specifically about 70 to about 180° C., more specifically about 80 to about 160° C. When the drying temperature is within this range, the solvent evaporates at an appropriate rate and within a suitable time, and thus the drying process is effectively performed. Accordingly, the solvent is substantially or effectively removed, and in an embodiment there is effectively no remaining solvent in the dielectric layer, and a compact, uniform dielectric layer may be obtained.

In an embodiment of the disclosed method, the dielectric paste composition is disposed (e.g., printed or coated) on the substrate and is not subjected to a sintering process, but subjected to the drying process, which is at a low temperature (e.g., in the range of about 60 to about 200° C., specifically about 70 to about 180° C., more specifically about 80 to about 160° C.), and thus a highly flexible high-k dielectric layer may be obtained. If the sintering process is performed, the binder, which is included in the dielectric paste composition, may be thermally decomposed, precluding formation of a sufficiently flexible dielectric layer.

The dielectric layer may have a Young's modulus (e.g., tensile modulus) in the range of about 0.01 to about 10 gigaPascals ("GPa"), specifically about 0.1 to about 5 GPa, more specifically 0.5 to 3 GPa.

In an embodiment, the dielectric layer includes an inorganic dielectric particle, a binder, and a halogenated hydrocarbon. A detailed description of advantages, features, and functions of the inorganic dielectric particles, the binder, and the halogenated hydrocarbon has already been provided above, and thus is not repeated.

The dielectric layer may have a high dielectric constant. While not wanting to be bound by theory, it is believed that the high dielectric constant is due at least in part to chemical bonding between the inorganic dielectric particle and the halogenated hydrocarbon, and because the preparation process of the dielectric layer does not include a sintering process. Also, because the preparation process of the dielectric layer does not include a sintering process, the prepared dielectric layer may be highly flexible.

The dielectric layer may be used in a device, such as an inorganic electroluminescent device, a film condenser, a capacitor, a piezoelectric element, a pyroelectric element, and a flexible display such as, for example, e-paper.

Figure 2:
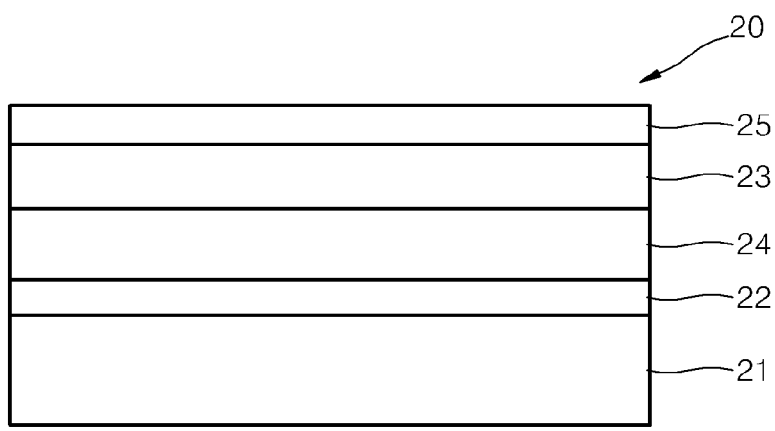
FIG. 2 is a cross-sectional view of another embodiment of an inorganic electroluminescent device comprising a dielectric layer prepared using an embodiment of a dielectric paste composition.

FIGS. 1 and 2 are, respectively, cross-sectional views of first and second inorganic electroluminescent devices 10 and 20, respectively, that each respectively include a dielectric layer 14 and 24 that are each prepared using the dielectric paste composition.

Referring to FIG. 1, the inorganic electroluminescent device 10 may include a substrate 11, a first electrode 12, an emission layer 13, a dielectric layer 14, and a second electrode 15.

The substrate 11 may comprise a transparent material, for example, glass, and light emitted from the emission layer 13 may be emitted to the outside via the substrate 11.

The first electrode 12 may comprise indium tin oxide ("ITO"), for example.

The emission layer 13 emits light when a voltage is applied between the first electrode 12 and the second electrode 15. The emission layer 13 may include a phosphor such as ZnS, a binder such as a copolymer of cyanoethyl pullulan and cyanoethyl polyvinylalcohol, and a solvent such as dimethylformamide.

The dielectric layer 14 may be prepared by disposing (e.g., printing or coating) the dielectric paste composition disclosed above on at least one of the emission layer 13, or the second electrode 15. The dielectric layer 14 may be interposed between the emission layer 13 and the second electrode 15.

The second electrode 15 may comprise aluminum, for example, and may be an aluminum electrode.

In the inorganic electroluminescent device 10 having such a structure, a brightness of light that is emitted from the emission layer 13 when a voltage is applied between the first electrode 12 and the second electrode 15 and is then emitted to the outside via the substrate 11 may be enhanced due to a high dielectric constant of the dielectric layer 14.

Referring to FIG. 2, the inorganic electroluminescent device 20 may include a substrate 21, a first electrode 22, a dielectric layer 24, an emission layer 23, and a second electrode 25. In this regard, the first electrode 22 and the second electrode 25 may each comprise ITO, for example.

The structure of the inorganic electroluminescent device 20 of FIG. 2 is different from the structure of the inorganic electroluminescent device 10 of FIG. 1 in that both the first electrode 22 and the second electrode 25 may be a transparent electrode, for example, an ITO electrode, and the configuration of the emission layer 23 and the dielectric layer 24 is the opposite to that of the emission layer 13 and the dielectric layer 14. In the inorganic electroluminescent device 20, the emission layer 23 is interposed between the dielectric layer 24 and the second electrode 25.

An embodiment will now be disclosed more fully in conjunction with the following examples. These examples are for illustrative purpose only and are not intended to limit the scope of the disclosed embodiments.

EXAMPLES

Examples 1a Through 1l and Comparative Examples 1a and 1b

Preparation of Dielectric Paste Compositions and Dielectric Layers

Cyanoethyl pullulan (Shin-Etsu, "CRS") and dimethylformamide ("DMF") were mixed in a ratio shown in Table 1 below, and the mixture was stirred for 2 hours to form a binder solution. Subsequently, a halogenated hydrocarbon was added to the binder solution at a ratio as shown in Table 1 below the resulting mixture was stirred, and barium titanate (Samsung Fine Chemicals Co. Ltd., "SBT-03") was added thereto to prepare an undispersed dielectric paste composition. Thereafter, zirconia beads having a diameter of 5 millimeters (mm) were added to the dielectric paste composition in the same volume as that of the dielectric paste composition, and the resulting mixture was ball-milled for 12 hours to prepare a dispersed dielectric paste composition. Subsequently, the dispersed dielectric paste composition was spin coated on a glass substrate coated with ITO (JMC, ITO glass 1.8 T Soda Lime) at 3000 revolutions per minute (rpm) and dried at 130° C. for 30 minutes to form a dielectric layer. Then, a voltage of 0.1 volts (V) was applied to the dielectric layer via ITO electrode at room temperature by varying a frequency from 10 Hertz (Hz) to 1 megaHertz (MHz), and the dielectric constant and dielectric loss of the dielectric layer were measured using an Inductance (L), Capacitance (C), and Resistance (R) ("LCR")-meter (AGILENT, E4980A). The dielectric constant measurement results are shown in Table 2 below, FIG. 3, and FIG. 4. The measured dielectric loss was 0.1 or less in Examples 1a through 1l and Comparative Examples 1a and 1b.

TABLE 1

| | SBT-03 (wt %) | CRS (wt %) | DMF (wt %) | Halogenated hydrocarbon Type | Concentration (wt %) |
| --- | --- | --- | --- | --- | --- |
| Comparative Example 1a | 38 | 11 | 51 | — | 0 |
| Example 1a | 34 | 10 | 46 | CB | 10 |
| Example 1b | 30 | 9 | 41 | CB | 20 |
| Example 1c | 26 | 8 | 36 | CB | 30 |
| Example 1d | 34 | 10 | 46 | DCM | 10 |
| Example 1e | 34 | 10 | 46 | CF | 10 |
| Example 1f | 34 | 10 | 46 | DCB | 10 |
| Comparative Example 1b | 34 | 10 | 46 | THF | 10 |
| Example 1g | 20 | 15 | 60 | CF | 5 |
| Example 1h | 20 | 15 | 60 | DCB | 5 |
| Example 1i | 20 | 15 | 60 | CB | 5 |
| Example 1j | 20 | 10 | 50 | CF | 20 |
| Example 1k | 25 | 14.4 | 60 | PVC | 0.6 |
| Example 1l | 25 | 14.4 | 60 | PCS* | 0.6 |

In Table 1, CB refers to chlorobenzene, DCM refers to dichloromethane, CF refers to chloroform, DCB refers to dichlorobenzene, THF refers to tetrahydrofuran, PVC refers to polyvinylchloride having a number average molecular weight of 22,000 to 44,000, and PCS refers to polychlorostyrene. "wt %" is based on the total weight of the composition.

TABLE 2

| | Dielectric Constant | | |
| --- | --- | --- | --- |
| | Frequency = 10 Hz | Frequency = 1 kHz | Frequency = 1 MHz |
| Comparative Example 1a | 85.42 | 75.93 | 0.17 |
| Example 1a | 947.29 | 393.73 | 0.04 |
| Example 1b | 398.64 | 253.56 | 24.35 |
| Example 1c | 433.90 | 301.02 | 1.62 |
| Example 1d | 118.94 | 82.44 | 0.90 |
| Example 1e | 207.60 | 107.77 | 0.04 |
| Example 1f | 682.98 | 324.34 | 0.07 |
| Comparative Example 1b | 87.21 | 63.01 | 0.60 |
| Example 1g | 210 | 110 | 0.04 |
| Example 1h | 680 | 330 | 0.09 |
| Example 1i | 950 | 400 | 0.03 |
| Example 1j | 520 | 330 | 0.05 |
| Example 1k | 220 | 130 | 1.62 |
| Example 1l | 225 | 120 | 0.42 |

Referring to Table 2, the dielectric layers prepared according to Examples 1a through 1l have a much higher dielectric constant at a frequency of 10 Hz and 1 kHz than that of the dielectric layers prepared according to Comparative Examples 1a and 1b, and have a similar or higher dielectric constant at a frequency of 1 MHz than the dielectric constant of the dielectric layers prepared according to Comparative Examples 1a and 1b.

Figure 3:
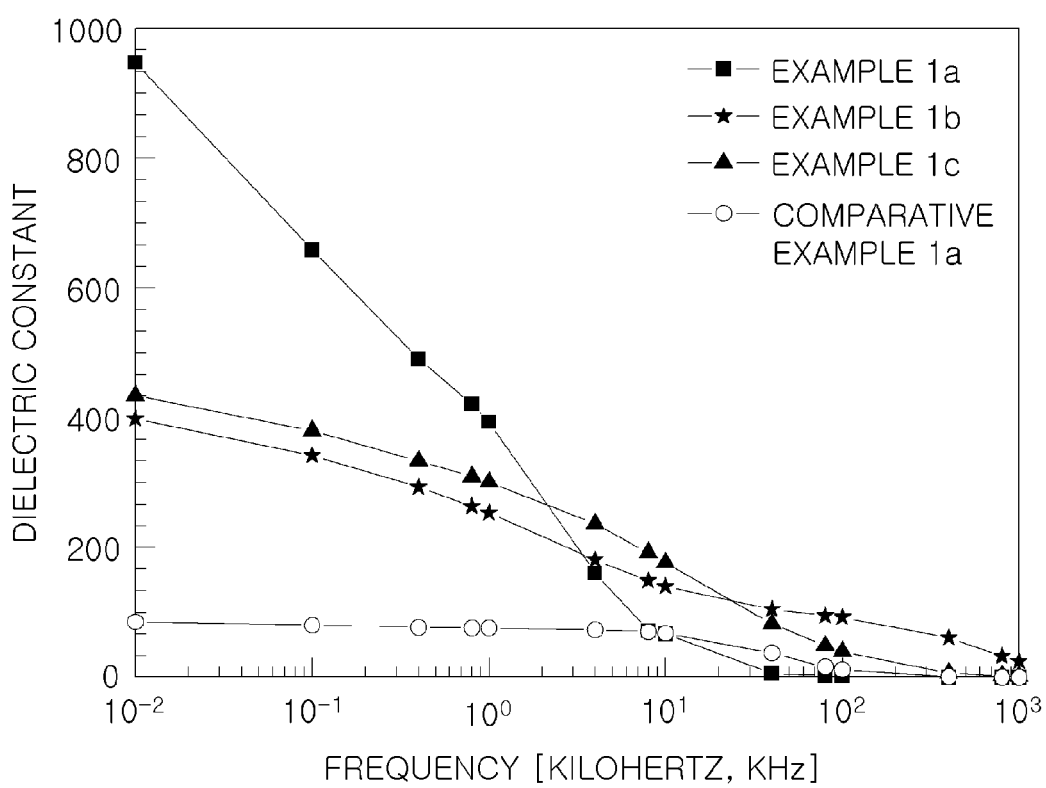
FIG. 3 is a graph of dielectric constant versus frequency (kilohertz, kHz) showing variations in a dielectric constant of an embodiment of a dielectric layer prepared using an embodiment of a dielectric paste composition according to Examples 1A through 1C and Comparative Example 1A.

Referring to FIG. 3, which includes results for Examples 1a through 1c and Comparative Example 1a, the dielectric constants of the dielectric layers that were each prepared using the disclosed dielectric paste composition are improved at all frequency ranges when the dielectric paste composition includes a halogenated hydrocarbon (for example, chlorobenzene), but the dielectric constant is not proportional to the concentration of the halogenated hydrocarbon. In addition, it was unexpectedly determined that the dielectric constant was not a linear function of the content of the halogenated hydrocarbon, but rather the dielectric constant at a specific frequency was highest at an intermediate content of the halogenated hydrocarbon. Also, the relative performance was different at different frequencies. For example, as shown in FIG. 3, at a frequency of less than about 1 kHz, the dielectric constant of Example 1c, which comprised 30 wt % chlorobenzene ("CB"), was higher than that of Example 1b, which comprised 20 wt % CB, and was less than that of Example 1a, which comprised 10 wt % CB. At a higher frequency, e.g., above about 10 kHz, Example 1b provided a higher dielectric constant than either of Examples 1a or 1c.

Figure 4:
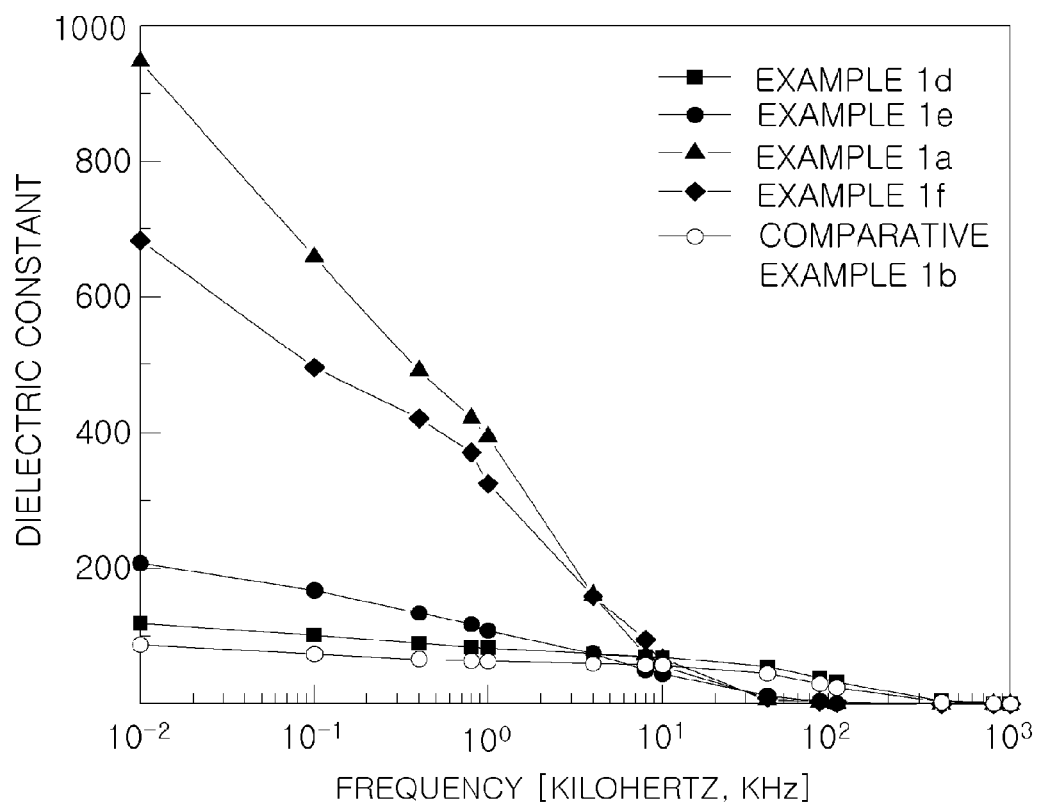
FIG. 4 is a graph of dielectric constant versus frequency (kilohertz, kHz) showing variations in a dielectric constant of an embodiment of a dielectric layer prepared according to Examples 1A and 1D through 1F and Comparative Example 1B, which comprised different types of a halogenated hydrocarbon in a dielectric paste composition.

FIG. 4 discloses results for compositions comprising 10 wt % of the halogenated hydrocarbon. Referring to FIG. 4, which provides results for Examples 1a and 1d through 1f and Comparative Example 1b, it was determined that although the dielectric paste compositions included the halogenated hydrocarbon at a same weight ratio, the dielectric constants of the prepared dielectric layers, measured at a specific frequency, varied depending on the type of the halogenated hydrocarbon.

Example 2a and Comparative Example 2a

Manufacture of Inorganic Electroluminescent Device

An inorganic electroluminescent device having the structure illustrated in FIG. 1 was manufactured using the following method.

Preparation Example 1

Preparation of Dielectric Paste Composition

A dielectric paste composition was prepared in the same manner as in Examples 1a through 11 and Comparative Examples 1a and 1b, except that barium titanate (Samsung Fine Chemicals Co. Ltd., "SBT-03"), Cyanoethyl pullulan (Shin-Etsu, "CRS"), dimethylformamide ("DMF"), and chloroform were used in a weight ratio of 60:18:82:12.

Preparation Example 2

Preparation of Phosphor Paste Composition and Emission Layer

An amount of 15 parts by weight of a cyanoethyl pullulan/cyanoethyl polyvinylalcohol copolymer (Shin-Etsu, "CRM") and 60 parts by weight of dimethylformamide ("DMF") were mixed together, and the mixture was stirred for 2 hours to prepare a binder solution. Subsequently, 25 parts by weight of ZnS doped with Mn (Mitsubishi Chemical, KX-605A) was added to the binder solution and mixed together to prepare an undispersed phosphor paste composition. Thereafter, zirconia beads having a diameter of 5 mm were added to the phosphor paste composition in the same volume as that of the phosphor paste composition, and the resulting mixture was ball-milled for 12 hours to prepare a dispersed phosphor paste composition. Subsequently, the dispersed phosphor paste composition was spin coated on a glass substrate coated with ITO (JMC, ITO glass 1.8 T Soda Lime) at 800 rpm, and the resulting structure was dried at 130° C. for 30 minutes to form an emission layer.

Example 2a

Manufacture of Inorganic Electroluminescent Device

Figure 5:
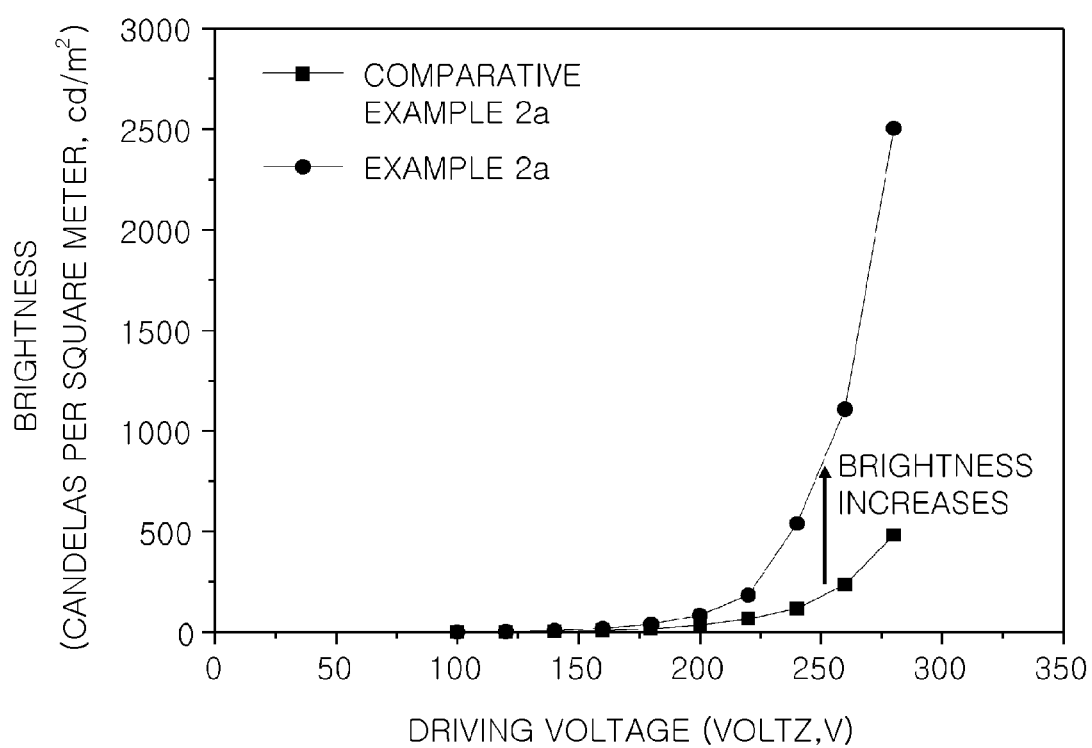
FIG. 5 is a graph of brightness (candelas per square meter, $cd/m^2$) versus driving voltage (Volts, V) showing variation in brightness with respect to a driving voltage of an embodiment of an inorganic electroluminescent device manufactured according to Example 2A and Comparative Example 2A.

The dielectric paste composition prepared according to Preparation Example 1 was spin coated on the emission layer prepared according to Preparation Example 2 and dried at 130° C. for 30 minutes to form a dielectric layer. Subsequently, an aluminum electrode was formed on the dielectric layer to complete the manufacture of the inorganic electroluminescent device. In this regard, the aluminum electrode was formed by sputtering deposition at 80 watts (W) direct current ("DC"), and the thickness of the aluminum electrode was 200 nanometers (nm). Then, the brightness of the manufactured inorganic electroluminescent device was measured using a brightness measuring device (BM-7, Topcon) by varying a driving voltage of the inorganic electroluminescent device from 100 V to 280 V, and the results are illustrated in FIG. 5.

Comparative Example 2a

Manufacture of Inorganic Electroluminescent Device

An inorganic electroluminescent device was manufactured in the same manner as in Example 2a, except that the dielectric paste composition of Comparative Example 1a was used instead of the dielectric paste composition of Preparation Example 1, and the brightness of the inorganic electroluminescent device was measured by applying a driving voltage thereto. The results are shown in Table 3 below and in FIG. 5. In Table 3, $cd/m^2$ refers to candelas per square meter.

TABLE 3

| | Driving voltage (V) | 100 | 120 | 140 | 160 | 180 | 200 | 220 | 240 | 260 | 280 |
|---|---|---|---|---|---|---|---|---|---|---|---|
| Brightness ($cd/m^2$) | Example 2a | 1 | 3.5 | 9.2 | 19 | 40 | 84 | 184 | 540 | 1110 | 2503 |
| | Comparative Example 2a | 1 | 1.8 | 4 | 8.8 | 18 | 35 | 66 | 118 | 237 | 482 |

Referring to Table 3 and FIG. 5, the inorganic electroluminescent device manufactured according to Example 2a has a higher brightness than that of the inorganic electroluminescent device manufactured according to Comparative Example 2a, and it is determined that as the driving voltage increases, a difference in brightness also increases. While not wanting to be bound by theory, it is believed that this result may be attributed to a difference in dielectric constant between the dielectric layers of the inorganic electroluminescent devices.

Analysis Example 1

Evaluation of Whether Halogenated Hydrocarbon Exists in Dielectric Layer

A material produced by heating the dielectric layer prepared according to Example 1d at 200° C. was collected, and the collected material was analyzed by gas chromatography-mass spectroscopy ("GC-MS") (AGILENT, 6890) to obtain a GC-MS spectrum. The GC-MS spectrum results are illustrated in FIG. 6.

Figure 6:
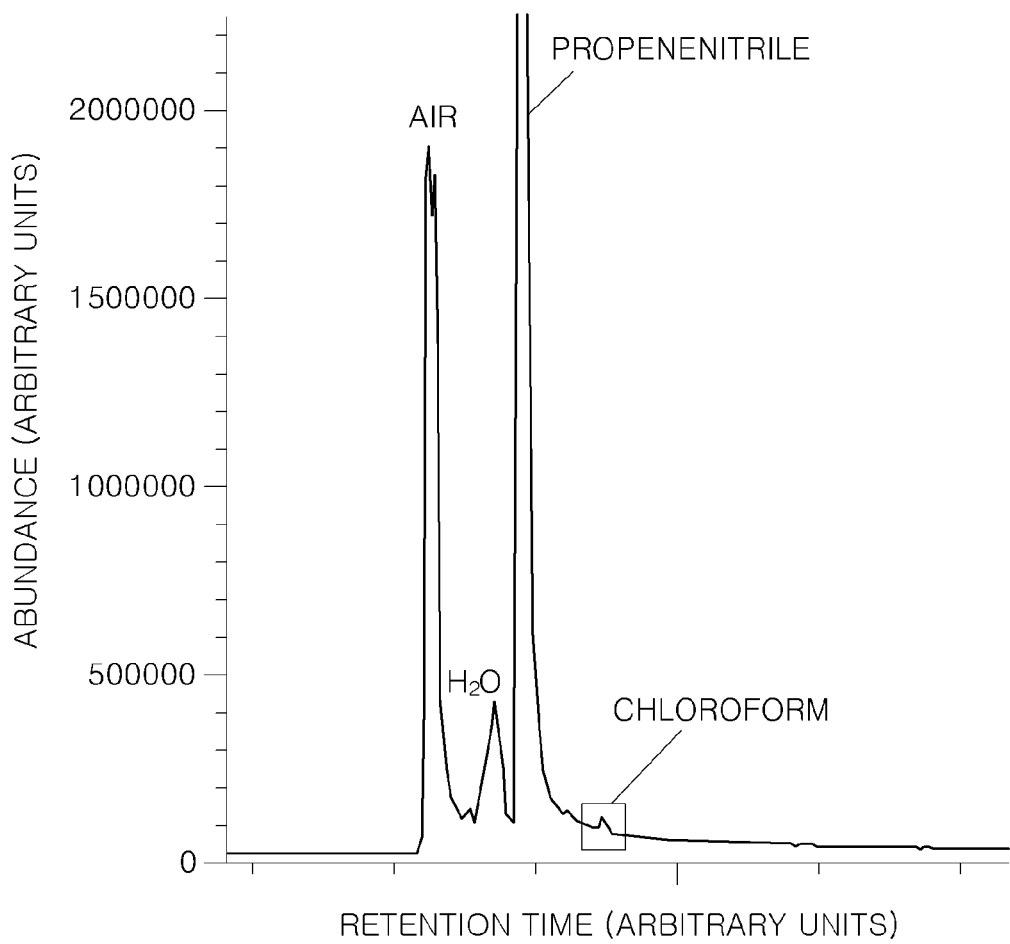
FIG. 6 is a graph of abundance (number) verses Retention time (time, arbitrary units) showing a GC-MS spectrum obtained from gas chromatography-mass spectroscopy (GC-MS) analysis of a material produced by heating a dielectric layer of Example 1D up to 200° C.

Referring to FIG. 6, it is confirmed that chloroform still exists in the dielectric layer even after the formation of the dielectric layer is completed. While not wanting to be bound by theory, it is believed that from these results it can be determined that in the dielectric layer chloroform is chemically bonded to barium titanate (SBT-03). FIG. 6 also indicates that air may be trapped in pores of the dielectric layer or on the surface thereof, and propenenitrile may be produced by thermal decomposition of the binder.

As described above, according to an embodiment, there is provided a dielectric paste composition including a halogenated hydrocarbon as an additive, thereby having an enhanced dielectric constant. Also, there is provided a method of preparing a dielectric layer using the dielectric paste composition, the method including only a low temperature drying process and not including a high temperature sintering process after a printing or coating process, thereby preparing a dielectric layer with excellent dielectric properties. In addition, a flexible, high-k dielectric layer prepared using the dielectric paste composition is provided. Also provided is a device including the flexible, high-k dielectric layer, thereby having enhanced brightness and enhanced flexibility.

It should be understood that the exemplary embodiments described herein should be considered in a descriptive sense only and not for purposes of limitation. Descriptions of features or aspects of each embodiment should be considered as available for other similar features or aspects of other embodiments.

What is claimed is:

1. A dielectric paste composition comprising:
   a plurality of inorganic dielectric particles,
   a binder,
   a non-halogenated solvent, and
   a halogenated hydrocarbon, wherein an amount of the halogenated hydrocarbon is in a range of about 0.1 to about 40 parts by weight, based on 100 parts by weight of the dielectric paste composition, and
   wherein the halogenated hydrocarbon is a polymer.

2. The dielectric paste composition of claim 1, wherein the inorganic dielectric particles comprise at least one of a titanium oxide, an antimony oxide, and a tin oxide.

3. The dielectric paste composition of claim 1, wherein the inorganic dielectric particles have an average diameter of 1 micrometer or less.

4. The dielectric paste composition of claim 1, wherein the binder comprises at least one of cyanoethyl pullulan and a copolymer of cyanoethyl pullulan and cyanoethyl polyvinyl alcohol.

5. The dielectric paste composition of claim 1, wherein the solvent comprises at least one of mesitylene, acetylacetone, methylcyclohexanone, diisobutylketone, methylphenylketone, dimethyl sulfoxide, γ-butyrolactone, isophorone, diethylformamide, dimethylformamide, dimethylacetamide, N-methylpyrrolidone, γ-butyrolactam, ethyleneglycol acetate, 3-methoxy-3-methylbutanol and an acetate thereof, 3-methoxybutyl acetate, 2-ethylhexyl acetate, oxalic acid ester, diethyl malonate, maleic acid ester, propylene carbonate, butyl cellosolve, and ethyl carbitol.

6. The dielectric paste composition of claim 1, wherein the halogenated hydrocarbon is a compound that is a liquid at 21° C.

7. The dielectric paste composition of claim 1, wherein the halogenated hydrocarbon is a polymer that is in the form of a solid powder at 21° C.

8. The dielectric paste composition of claim 1, wherein the halogenated hydrocarbon is a polymer of a substituted or unsubstituted C2 to C18 haloalkene, a polymer of a substituted or unsubstituted C5 to C18 halocycloalkene, a polymer of a substituted or unsubstituted C8 to C18 haloarylalkene, a polymer of a substituted or unsubstituted C6 to C18 haloarene, or a polymer of a halo(C1 to C12)alkyl(meth)acrylate.

9. The dielectric paste composition of claim 1, wherein the amount of the inorganic dielectric particles is in a range of about 10 to about 70 parts by weight, based on 100 parts by weight of the dielectric paste composition.

10. The dielectric paste composition of claim 1, wherein the amount of the binder is in a range of about 1 to about 30 parts by weight, based on 100 parts by weight of the dielectric paste composition.

11. A method of preparing a dielectric layer, the method comprising:
    disposing a dielectric paste composition comprising:
       a plurality of inorganic dielectric particles,
       a binder,
       a non-halogenated solvent, and
       a halogenated hydrocarbon, wherein an amount of the halogenated hydrocarbon is in a range of about 0.1 to about 40 parts by weight, based on 100 parts by weight of the dielectric paste composition, and
       wherein the halogenated hydrocarbon is a polymer,
    on a substrate; and
    drying the disposed dielectric paste composition to prepare the dielectric layer.

12. The method of claim 11, wherein the drying is performed at a temperature in a range of about 60 to about 200° C.

13. The method of claim 11, wherein the printed or coated dielectric paste composition is not subjected to a sintering process.

14. A dielectric layer comprising:
    a plurality of inorganic dielectric particles,
    a binder, and
    a halogenated hydrocarbon, wherein an amount of the halogenated hydrocarbon is provided by a dielectric paste composition comprising the halogenated hydrocarbon in a range of about 0.1 to about 40 parts by weight, based on 100 parts by weight of the dielectric paste composition, and wherein the halogenated hydrocarbon is a polymer.

15. The dielectric layer of claim 14, having a Young's modulus of about 0.01 to about 10 GPa.

16. A device comprising the dielectric layer according to claim 14.

17. The device of claim 16, being an inorganic electroluminescent device, a film condenser, a capacitor, a piezoelectric element, a pyroelectric element, or a flexible display.

* * * * *